United States Patent
Lee et al.

(10) Patent No.: US 8,778,288 B1
(45) Date of Patent: *Jul. 15, 2014

(54) SEPARATION METHOD OF ZIRCONIUM AND HAFNIUM BY SOLVENT EXTRACTION PROCESS

(71) Applicants: Korea Institute of Science and Technology, Seoul (KR); Posco M-Tech, Gyeongsangbuk-do (KR)

(72) Inventors: Hwa Young Lee, Seoul (KR); Byung Won Cho, Seoul (KR); Joong Kee Lee, Seoul (KR)

(73) Assignees: Korea Institute of Science and Technology, Seoul (KR); Posco M-Tech, Gyeongsangbuk-do (KR)

( * ) Notice: Subject to any disclaimer, the term of this patent is extended or adjusted under 35 U.S.C. 154(b) by 11 days.

This patent is subject to a terminal disclaimer.

(21) Appl. No.: 13/852,143

(22) Filed: Mar. 28, 2013

(30) Foreign Application Priority Data

Feb. 4, 2013 (KR) ........................ 10-2013-0012519

(51) Int. Cl.
*B01D 11/00* (2006.01)

(52) U.S. Cl.
USPC .............................................. 423/70; 423/73

(58) Field of Classification Search
USPC ....................................................... 423/70, 73
See application file for complete search history.

(56) References Cited

U.S. PATENT DOCUMENTS

| 4,162,230 | A | | 7/1979 | Horwitz et al. | |
|---|---|---|---|---|---|
| 4,231,994 | A | * | 11/1980 | MacDonald | 423/70 |
| 5,176,878 | A | | 1/1993 | Sarbeck et al. | |
| 8,557,202 | B1 | * | 10/2013 | Lee et al. | 423/70 |

FOREIGN PATENT DOCUMENTS

| JP | 1996-015483 A | 1/1996 |
|---|---|---|
| KR | 19940011359 A | 6/1994 |
| KR | 1020010047045 A | 6/2001 |
| KR | 1020070065877 A | 6/2007 |

OTHER PUBLICATIONS

M. Taghizadeh, et al; "Separation of zicronium and hafnium by solvent extraction using mixture of TBP and Cyanex 923", Journal of Nuclear Materials, vol. 412, pp. 334-337, Available online Mar. 30, 2011.

I.S. El-Yamani, et al; Studies on Extraction of Zirconium(IV) by Tricapryl Methyl Ammonium Chloride From Sulphate Media and Its Separation From Hafnium(IV), Journal of Radioanalytical Chemistry, vol. 45, Issue 1, pp. 125-133; Mar. 1, 1978.

Korean Patent Office Notice of Allowance dated Mar. 26, 2014; Appln. No. 10-2013-0012519.

* cited by examiner

*Primary Examiner* — Melissa Stalder
(74) *Attorney, Agent, or Firm* — Ladas & Parry LLP

(57) ABSTRACT

A separation method of zirconium and hafnium is described which includes an extraction process of agitating an undiluted aqueous solution containing zirconium, hafnium, and sulfuric acid with a first stirring solution containing an acidic extractant to produce a first extract solution in which the hafnium is extracted by the acidic extractant; and a recovery process of agitating the first extract solution with a second stirring solution containing a citric acid solution to produce a citric acid solution after extraction in which zirconium is reverse-extracted from the first extract solution to the citric acid solution so as to recover zirconium contained in the first extract solution. The method may reduce the amount of extractant while greatly enhancing the separation effect of zirconium and hafnium, and increase zirconium recovery rate by more than 97% through an additional zirconium recovery process while reducing a hafnium content in zirconium by less than 50 ppm.

20 Claims, No Drawings

SEPARATION METHOD OF ZIRCONIUM AND HAFNIUM BY SOLVENT EXTRACTION PROCESS

RELATED APPLICATION

This application claims the benefit of Korean Patent Application No. 10-2013-0012519, filed on Feb. 4, 2013, which is hereby incorporated by reference for all purposes as if fully set forth herein.

BACKGROUND OF THE INVENTION

1. Field of the Invention

The present invention relates to a method of effectively separating zirconium and hafnium in aqueous solution using a solvent extraction process that uses an acidic extractant D2EHPA (Di-(2-ethylhexyl)phosphoric acid) or PC88A (2-Ethylhexyl phosphonic acid mono-2-ethylhexyl ester), and more particularly, to a separation method of zirconium and hafnium for greatly enhancing the separation effect while reducing the usage of the extractant compared to the related art.

2. Background of the Invention

Zirconium is an essential element used for nuclear fuel rods in nuclear power, and has characteristics such as excellent high temperature strength and corrosion resistance and a very small neutron absorption cross section of about 0.18 barn. On the contrary, the neutron absorption cross section of hafnium is 600 times greater than that of zirconium 600, and thus metallic zirconium used for nuclear fuel rods should have very low content of hafnium.

In general, zirconium ore distributed in the earth's crust contains approximately 0.5 to 2 percent of hafnium, but the physicochemical properties of zirconium and hafnium are so similar, thereby causing much difficulty in mutual separation. The separation methods of zirconium and hafnium known until now may include a fractional crystallization method of fluoride complexes, a distillation method using a difference between the volatilities of chlorides, a solvent extraction method, and the like. Each of those various separation methods has advantages and disadvantages, and thus an appropriate separation method should be selected by taking economic efficiency, operational environment, and the like into consideration.

In case of the solvent extraction process, as a method that has been used since a long time ago to separate zirconium and hafnium, an extractant is used to separate the two metals existing in aqueous solution. At this time, a plurality of extractants such as diethyl ether, methyl isobutyl ketone (MIBK), tributyl phosphate (TBP), trioctyl amine (TOA), trioctyl methylammonium chloride, and the like have been used for the extractant in a single or mixed manner. However, there is only a few cases where the foregoing extractants are actually commercialized and applied to the separation of zirconium and hafnium. It is because there exist rare extractants having a great effect on the separation of zirconium and hafnium as well as economic issues such as the cost of the extractants.

The solvent extraction processes for zirconium and hafnium commercialized up to now may include a process of using methyl isobutyl ketone (MIBK) as an extractant and a process of using tri-butyl phosphate (TBP) as an extractant.

The process of using methyl isobutyl ketone (MIBK) as an extractant has an advantage in that the use amount of the extractant is low since a far less amount of hafnium is selectively extracted from aqueous solution compared to zirconium, but causes an environmental pollution problem due to cyanide compounds since thiocyanate ions ($SCN^{-1}$) should be added to aqueous solution prior to the extraction process as well as has a problem in that the cost of MIBK is high. Furthermore, there is a disadvantage in that the loss of extractant is high since the solubility of MIBK in water is very high, about 1.8%.

On the other hand, the process of using tri-butyl phosphate (TBP) has an advantage in that cyanide compounds is not required to be added contrary to the MIBK process, but has a problem in that the cost of extractants is high, and the use amount of the extractant is relatively excessive since zirconium rather than hafnium is selectively extracted from aqueous solution.

Accordingly, the technological development of an extractant and its extracting condition capable of satisfying both the economical efficiency and zirconium and hafnium separation effect as well as overcoming the foregoing problems is required, but effective solvent extraction processes of zirconium and hafnium that can substitute the conventional methods have not been developed until now.

DISCLOSURE OF PRIOR ART DOCUMENTS

Patent literatures are listed below.
U.S. Pat. No. 5,176,878, Zirconium-hafnium separation process
U.S. Pat. No. 4,162,230, Method for the recovery of actinide elements from nuclear reactor waste
Non-patent literatures are listed below.
Separation of Zr/Hf with Solvent Extraction, J. Nuclear Materials, 412, 334, 2011
Extraction of Zirconium with TMAC, J. Radioanalytical Chemistry, 45, 125, 1978

SUMMARY OF THE INVENTION

An object of the present invention is to provide a separation method of zirconium and hafnium capable of allowing environmentally-friendly applications since toxic compounds such as cyanide are not used and extracting only hafnium having a very low content compared to zirconium, thereby greatly reducing the amount of extractant consumed in the extraction and separation of a metal, and increasing zirconium recovery rate by more than 97% through an additional zirconium recovery process while reducing a hafnium content in zirconium by less than 50 ppm.

In order to accomplish the foregoing objective, a separation method of zirconium and hafnium according to an embodiment of the present invention may include an extraction process of agitating an undiluted aqueous solution containing zirconium, hafnium, and sulfuric acid with a first stirring solution containing an acidic extractant to produce a first extract solution in which the hafnium is extracted by the acidic extractant; and a recovery process of agitating the first extract solution with a second stirring solution containing a citric acid solution to produce a citric acid solution after extraction in which zirconium is reverse-extracted from the first extract solution to the citric acid solution so as to recover zirconium contained in the first extract solution.

The acidic extractant may include any one selected from a group consisting of D2EHPA (di-(2-ethylhexyl)phosphoric acid), PC88A (2-ethylhexyl phosphonic acid mono-2-ethylhexyl ester) and their combinations.

The separation method of zirconium and hafnium further may include a stripping process subsequent to the recovery process, and the stripping process may further include a process of mixing a second extract solution, which is the first extract solution subjected to the recovery process, with a third stirring solution containing a strip solution to completely remove zirconium and hafnium contained in the second extract solution.

The strip solution may contain oxalic acid or may be an oxalic acid solution in a concentration of oxalic acid of 0.1 to 1 mol/l.

The undiluted solution may contain the sulfuric acid of 2 to 10 mol/l.

The citric acid solution may be a citric acid solution in a concentration of citric acid of 0.05 to 0.2 mol/l.

The acidic extractant may further include a diluent which is an organic solvent.

The second extract solution subjected to the stripping process may be reused as an acidic extractant in the extraction process.

The separation method of zirconium and hafnium may be a separation method which does not use cyanide compounds, and the recovery rate of zirconium recovered by the separation method of zirconium and hafnium may be greater than 97 weight %, and the content of hafnium contained in the recovered zirconium may be less than 50 ppm.

Hereinafter, the present invention will be described in more detail.

The separation method of zirconium and hafnium may include an extraction process and a recovery process. A stripping process may be further included subsequent to the recovery process.

The extraction process may include a process of agitating an undiluted aqueous solution containing zirconium, hafnium, and sulfuric acid with a first stirring solution containing an acidic extractant to produce a first extract solution in which the hafnium is extracted by the acidic extractant. The hafnium contained in the undiluted solution during the extraction process may be almost all extracted by an acidic extractant and contained in the first extract solution, and part of zirconium may be extracted into the first extract at the same time.

The undiluted solution may be a solution in which a zirconium compound containing a predetermined amount of hafnium is dissolved in an aqueous solution containing sulfuric acid, or the zirconium compound is mixed with water and sulfuric acid is mixed therewith. The undiluted solution should be an aqueous solution in which sulfuric acid is mixed with zirconium and hafnium, and the use of sulfuric acid is appropriate to enhance a selective recovery rate of zirconium compared to the use of hydrochloric acid or nitric acid.

The concentration of sulfuric acid contained in the undiluted solution may be 2 to 10 mol/l, and the separation effect of zirconium and hafnium may be reduced when the concentration of the sulfuric acid is out of the range.

The acidic extractant may include any one selected from a group consisting of D2EHPA (di-(2-ethylhexyl)phosphoric acid), PC88A (2-ethylhexyl phosphonic acid mono-2-ethyl-hexyl ester) and their combinations. When an extractant other than D2EHPA or PC88A is used as the acidic extractant, the separation effect of zirconium and hafnium may be greatly reduced or it may be difficult to selectively extract only hafnium.

The acidic extractant may further include a diluent, and the diluent may be an organic solvent, and specifically, any one organic solvent selected from a group consisting of kerosene, hexane, benzene, toluene, and their combinations may be used for the diluent. However, the diluent may not necessarily limited to the foregoing organic solvent, but any one performing the role of the diluent of an acidic extractant while not deteriorating the separation of zirconium and hafnium according to the present invention may be applicable thereto.

During the extraction process, hafnium in an undiluted solution is selectively extracted by an acidic extractant using a method of intensely agitating the undiluted solution which is aqueous solution containing zirconium, hafnium and sulfuric acid with a first stirring solution in which an acidic extractant is contained and they form layers, respectively, in a reactor, and then agitation is completed to phase-separate a first extract solution, which is an acidic extractant containing hafnium, from the undiluted solution from which hafnium is removed.

Subsequent to the extraction process, part of zirconium in the undiluted solution is extracted by the acidic extractant at the same time, but the zirconium and hafnium may be effectively separated since the residue remains in the undiluted solution while hafnium is almost all extracted by the acidic extractant.

The agitation may be carried out at a normal temperature, but also carried out at high temperatures by increasing the temperature.

The first acidic extractant may include zirconium along with hafnium, and thus in order to increase the zirconium recovery rate, the process of reverse-extracting zirconium from the first acidic extractant may be required to perform the recovery process.

The recovery process may include a process of agitating the first acidic extractant with a second stirring solution in which a citric acid solution is contained and they form layers, respectively, to selectively reverse-extract zirconium from the first acidic extractant by the citric acid solution, and the citric acid solution subjected to the reverse-extraction process may be referred to as a second extract solution, and most of zirconium contained in the first acidic extractant during the recovery process may be moved (reverse-extracted) to a citric acid solution after extraction while suppressing the reverse extraction of hafnium, thereby to maximizing the separation effect of zirconium and hafnium.

The citric acid solution may be a citric acid aqueous solution in a concentration of citric acid of 0.05 to 0.2 mol/l. When the concentration of citric acid in the citric acid solution is out of the range, the zirconium recovery rate may be decreased or the separation effect of zirconium and hafnium may be reduced.

The stripping process may include a process of mixing a second extract solution, which is the first extract solution subjected to the recovery process, with a third stirring solution containing a strip solution to completely remove zirconium and hafnium contained in the second extract solution. The stripping process is a process for recycling the acidic extractant used as an acidic extractant for its reuse, and subsequent to the stripping process, both zirconium and hafnium may be all removed from the second extract solution and recycled as an acidic extractant.

For a strip solution used for the stripping process, any solution containing oxalic acid may be used, and both hafnium and a small amount of zirconium contained in the second extract solution may be all removed using this solution.

The strip solution may be an oxalic acid solution in a concentration of oxalic acid of 0.1 to 1 mol/l, and when the concentration of oxalic acid in an oxalic acid solution is out of the range, the hafnium strip rate may be reduced or the consumption amount of chemicals may be excessively increased.

The separation method of zirconium and hafnium according to the present invention relates to a separation method of zirconium and hafnium using an acidic extractant, and a relatively small amount of hafnium compared to zirconium may be selectively extracted, thereby greatly enhancing the separation effect of zirconium and hafnium which are not easily separable while reducing the use amount of extractant. Furthermore, the separation method of zirconium and hafnium is a separation method using a solvent extraction process which does not use cyanide compounds contrary to the existing methods, and an environmentally-friendly method since the used acidic extractant can be also recycled for reuse.

According to the present invention, toxic compounds such as cyanide may not be used to allow environmentally-friendly applications and only hafnium having a very low content compared to zirconium may be selectively extracted, thereby greatly reducing the amount of extractant consumed in the extraction and separation of a metal, and increasing zirconium recovery rate by more than 97% through an additional zirconium recovery process while reducing a hafnium content in zirconium by less than 50 ppm.

BEST MODE FOR CARRYING OUT THE INVENTION

Hereinafter, examples of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments.

Example 1

1) Extraction Process

One liter of a sulfuric acid aqueous solution (concentration of sulfuric acid 2 mol/l, undiluted solution) containing 35,500 mg/l of zirconium and 290.5 mg/l of hafnium was mixed with one liter of D2EHPA (di-(2-ethylhexyl)phosphoric acid, acidic extractant) in a reactor to produce a first extract solution in which hafnium is selectively extracted by the acidic extractant while being intensely agitated for one hour. The extraction completed first extract solution and a sulfuric acid aqueous solution after extraction (diluted solution after first extraction) were separated, and zirconium and hafnium remained in the undiluted solution after first extraction were analyzed, and as a result, they were exhibited 26,300 mg/l and 0.97 mg/l, respectively, and thus it is seen that almost all hafnium was extracted by the first extract solution.

2) Zirconium Recovery Process

One liter of the first extract solution was mixed with one liter of a citric acid solution (citric acid aqueous solution, concentration of citric acid 0.2 mol/l) in a reactor and intensely agitated for one hour to produce a citric acid aqueous solution (citric acid solution after extraction) in which zirconium was extracted from the first extract solution. The citric acid solution after extraction was separated from the first extract solution for which agitation in the zirconium recovery process is completed (second extract solution), and zirconium and hafnium in the citric acid solution after extraction were analyzed, and as a result, they were exhibited 8,250 mg/l and 0.71 mg/l, respectively.

3) Stripping Process

One liter of the second extract solution was mixed with one liter of an oxalic acid aqueous solution (concentration of oxalic acid 1 mol/l) and intensely agitated for one hour. The whole amount of zirconium and hafnium contained in the second extract solution through the stripping process were removed, and the acidic extractant recycled in the stripping process was reused during the extraction process.

4) Evaluation of Separation Effect

The recovery rate of zirconium separated and recovered by the method of Example 1 was 97.3% {=(26,300+8,250)/35,500} when the sulfuric acid aqueous solution after extraction (undiluted solution subsequent to first extraction) and the content of zirconium contained in the citric acid solution after extraction were is summed up, thus exhibiting a remarkably excellent recovery rate.

Furthermore, when calculating the content of hafnium contained in the solution, the content of hafnium contained along with zirconium was remarkably reduced from an initial value 8,117 ppm {=290.5/(35,500+290.5)} to 48.6 ppm {=(0.97+ 0.71)/{(26,300+8,250)+(0.97+0.71)}}, and thus it is seen that the separation of zirconium and hafnium was very excellent.

Example 2

1) Extraction Process

One liter of a sulfuric acid aqueous solution (concentration of sulfuric acid 10 mol/l, undiluted solution) containing 35,500 mg/l of zirconium and 290.5 mg/l of hafnium was mixed with one liter of PC88A (2-ethylhexyl phosphonic acid mono-2-ethylhexyl ester, acidic extractant) in a reactor to produce a first extract solution in which hafnium is selectively extracted by the acidic extractant while being intensely agitated for one hour. The extraction completed first extract solution and a sulfuric acid aqueous solution after extraction (diluted solution after first extraction) were separated, and zirconium and hafnium remained in the undiluted solution after first extraction were analyzed, and as a result, they were exhibited 24,700 mg/l and 0.91 mg/l, respectively, and thus it is seen that almost all hafnium was extracted by the first extract solution.

2) Zirconium Recovery Process

One liter of the first extract solution was mixed with one liter of a citric acid solution (citric acid aqueous solution, concentration of citric acid 0.05 mol/l) in a reactor and intensely agitated for one hour to produce a citric acid aqueous solution (citric acid solution after extraction) in which zirconium was extracted from the first extract solution. The citric acid solution after extraction was separated from the first extract solution for which agitation in the zirconium recovery process is completed (second extract solution), and zirconium and hafnium in the citric acid solution after extraction were analyzed, and as a result, they were exhibited 10,120 mg/l and 0.80 mg/l, respectively.

3) Stripping Process

One liter of the second extract solution was mixed with one liter of an oxalic acid aqueous solution (concentration of oxalic acid 0.1 mol/l) and intensely agitated for one hour. The whole amount of zirconium and hafnium contained in the second extract solution through the stripping process were removed, and the acidic extractant recycled in the stripping process was reused during the extraction process.

4) Evaluation of Separation Effect

The recovery rate of zirconium separated and recovered by the method of Example 2 was 98.1% {=(24,700+10,120)/35,500} when the sulfuric acid aqueous solution (undiluted solution subsequent to first extraction) after extraction and the content of zirconium contained in the citric acid solution after extraction were summed up, thus exhibiting a remarkably excellent recovery rate.

Furthermore, when calculating the content of hafnium contained in the solution, the content of hafnium contained along with zirconium was remarkably reduced from an initial value 8,117 ppm {=290.5/(35,500+290.5)} to 49.1 ppm {=(0.91+0.80)/{(24,700+10,120)+(0.91+0.80)}}, and thus it is seen that the separation of zirconium and hafnium was very excellent.

Example 3

1) Extraction Process

One liter of a sulfuric acid aqueous solution (concentration of sulfuric acid 2 mol/l, undiluted solution) containing 35,500 mg/l of zirconium and 290.5 mg/l of hafnium was mixed with 0.25 liter of D2EHPA and 0.25 liter of PC88A and then placed into a reactor along with one liter of an acidic extractant mixed with 0.5 liter of kerosene as a diluent to produce a first extract solution in which hafnium is selectively extracted by the acidic extractant while being intensely agitated for one hour as illustrated in Example 1. The extraction completed first extract solution and a sulfuric acid aqueous solution after extraction (diluted solution after first extraction) were separated, and zirconium and hafnium remained in the undiluted solution after first extraction were analyzed, and as a result, they were exhibited 25,200 mg/l and 0.94 mg/l, respectively, and thus it is seen that almost all hafnium was extracted by the first extract solution.

2) Zirconium Recovery Process

One liter of the first extract solution was mixed with one liter of a citric acid solution (citric acid aqueous solution, concentration of citric acid 0.2 mol/l) in a reactor and intensely agitated for one hour to produce a citric acid aqueous solution (citric acid solution after extraction) in which zirconium was extracted from the first extract solution. The citric acid solution after extraction was separated from the first extract solution for which agitation in the zirconium recovery process is completed (second extract solution), and zirconium and hafnium in the citric acid solution after extraction were analyzed, and as a result, they were exhibited 9,480 mg/l and 0.78 mg/l, respectively.

3) Stripping Process

One liter of the second extract solution was mixed with one liter of an is oxalic acid aqueous solution (concentration of oxalic acid 1 mol/l) and intensely agitated for one hour. The whole amount of zirconium and hafnium contained in the second extract solution through the stripping process were removed, and the acidic extractant recycled in the stripping process was reused during the extraction process.

4) Evaluation of Separation Effect

The recovery rate of zirconium separated and recovered by the method of Example 3 was 97.7% {=(25,200+9,480)/35,500} when the sulfuric acid aqueous solution after extraction (undiluted solution subsequent to first extraction) and the content of zirconium contained in the citric acid solution after extraction were summed up, thus exhibiting a remarkably excellent recovery rate.

Furthermore, when calculating the content of hafnium contained in the solution, the content of hafnium contained along with zirconium was remarkably reduced from an initial value 8,117 ppm {=290.5/(35,500+290.5)} to 49.6 ppm {=(0.94+0.78)/{(25,200+9,480)+(0.94+0.78)}}, and thus it is seen that the separation of zirconium and hafnium was very excellent.

Although the preferred examples of the present invention have been described in detail, the rights scope of the present invention is not limited to the examples and various modifications and improvements thereto made by those skilled in the art using the basic concept of the present invention as defined in the accompanying claims will fall in the rights scope of the invention.

What is claimed is:

1. A separation method of zirconium and hafnium, comprising:
    an extraction process of agitating an undiluted aqueous solution containing zirconium, hafnium, and sulfuric acid with a first stirring solution containing an acidic extractant to produce a first extract solution in which the hafnium is extracted by the acidic extractant; and
    a recovery process of agitating the first extract solution with a second stirring solution containing a citric acid solution to produce a citric acid solution after extraction in which zirconium is reverse-extracted from the first extract solution to the citric acid solution so as to recover zirconium contained in the first extract solution,
    wherein the acidic extractant comprises any one selected from a group consisting of D2EHPA (di-(2-ethylhexyl) phosphoric acid), PC88A (2-ethylhexyl phosphonic acid mono-2-ethylhexyl ester) and their combination.

2. The separation method of zirconium and hafnium of claim 1, wherein the separation method of zirconium and hafnium further comprises a stripping process subsequent to the recovery process, and
    the stripping process comprises a process of mixing a second extract solution, which is the first extract solution subjected to the recovery process, with a third stirring solution containing a strip solution to remove zirconium and hafnium contained in the second extract solution.

3. The separation method of zirconium and hafnium of claim 2, wherein the strip solution contains oxalic acid.

4. The separation method of zirconium and hafnium of claim 3, wherein the strip solution is an oxalic acid solution in a concentration of oxalic acid of 0.1 to 1 mol/l.

5. The separation method of zirconium and hafnium of claim 1, wherein the undiluted solution contains the sulfuric acid of 2 to 10 mol/l.

6. The separation method of zirconium and hafnium of claim 1, wherein the citric acid solution is a citric acid solution in a concentration of citric acid of 0.05 to 0.2 mol/l.

7. The separation method of zirconium and hafnium of claim 1, wherein the acidic extractant further comprises a diluent which is an organic solvent.

8. The separation method of zirconium and hafnium of claim 2, wherein the second extract solution subjected to the stripping process is reused as an acidic extractant in the extraction process.

9. The separation method of zirconium and hafnium of claim 1, wherein the separation method of zirconium and hafnium does not use cyanide compounds.

10. The separation method of zirconium and hafnium of claim 1, wherein the recovery rate of zirconium recovered by the separation method of zirconium and hafnium is greater than 97 weight %, and the content of hafnium contained in the recovered zirconium is less than 50 ppm.

11. A method of separating zirconium from hafnium, the method comprising:
   extracting hafnium from an aqueous acidic solution that comprises zirconium, hafnium, sulfuric acid, and water into a first stirring solution that comprises an acidic extractant selected from the group consisting of D2EHPA (di-(2-ethylhexyl) phosphoric acid), PC88A (2-ethylhexyl phosphonic acid mono-2-ethylhexyl ester), and combination thereof; and
   recovering a portion of zirconium which was also extracted into the first stirring solution into a citric acid aqueous solution.

12. The method of claim 11, further comprising stripping the extracted hafnium from the first stirring solution into an aqueous strip solution.

13. The method of claim 12, further comprising recycling the first stirring solution after the first stirring solution is stripped of the extracted hafnium.

14. The method of claim 11, wherein the first stirring solution also comprises a diluent.

15. The method of claim 14, wherein the diluent of the first stirring solution is selected from the group consisting of kerosene, hexane, benzene, toluene, and combinations thereof.

16. The method of claim 11, wherein the aqueous acidic solution comprises sulfuric acid at a concentration of about 2 mol/l to about 10 mol/l.

17. The method of claim 11, wherein the citric acid aqueous solution comprises citric acid at a concentration of about 0.05 mol/l to about 0.2 mol/l.

18. The method of claim 11, wherein the aqueous strip solution comprises oxalic acid at a concentration at about 0.1 mol/l to about 1 mol/l.

19. The method of claim 11, wherein the method does not use cyanide compounds.

20. A method of separating zirconium from hafnium, the method comprising:
   extracting hafnium from an aqueous acidic solution that comprises zirconium, hafnium, sulfuric acid, and water into a first stirring solution that comprises an acidic extractant and a diluent, wherein the acidic extractant is selected from the group consisting of D2EHPA (di-(2-ethylhexyl)phosphoric acid), PC88A (2-ethylhexyl phosphonic acid mono-2-ethylhexyl ester), and combination thereof, and wherein the diluent is selected from the group consisting of kerosene, hexane, benzene, toluene, and combinations thereof; and
   recovering a portion of zirconium which was also extracted into the first stirring solution into a citric acid aqueous solution;
   stripping the extracted hafnium from the first stirring solution into an aqueous strip solution; and
   recycling the first stirring solution after the first stirring solution is stripped of the extracted hafnium.

\* \* \* \* \*